MENESSEH FRIES.
Improvement in Mill Stone Dress.

No. 119,134. Patented Sep. 19, 1871.

UNITED STATES PATENT OFFICE.

MANASSEH FRIES, OF PHILADELPHIA, PENNSYLVANIA, ASSIGNOR OF ONE-HALF HIS RIGHT TO KREIDER, ZINDGRAF & CO., OF SAME PLACE.

IMPROVEMENT IN MILLSTONE DRESS.

Specification forming part of Letters Patent No. 119,134, dated September 19, 1871.

*To all whom it may concern:*

Be it known that I, MANASSEH FRIES, of the city and county of Philadelphia and State of Pennsylvania, have invented an Improved Millstone Dress, of which the following is a specification:

My invention consists in laying out the grinding-face of a millstone in bunches or gangs of furrows with a land or flouring surface between the said bunches or gangs. Each bunch or gang consists of two or more contiguous or adjacent furrows.

Figure 1:
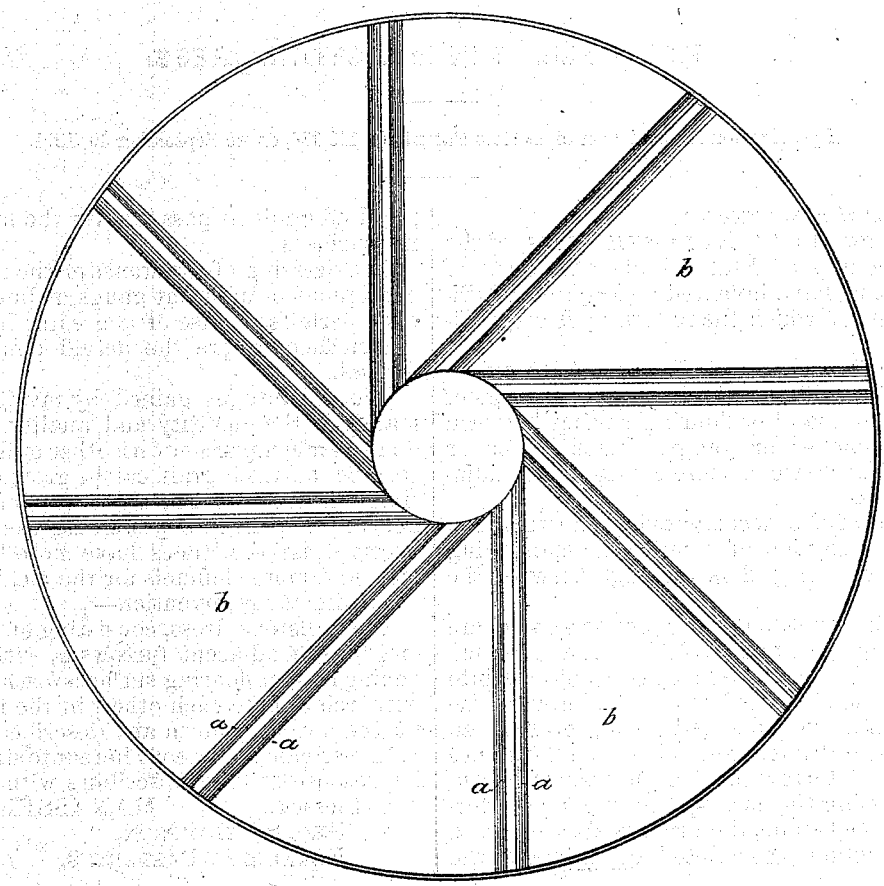
Figure 2:
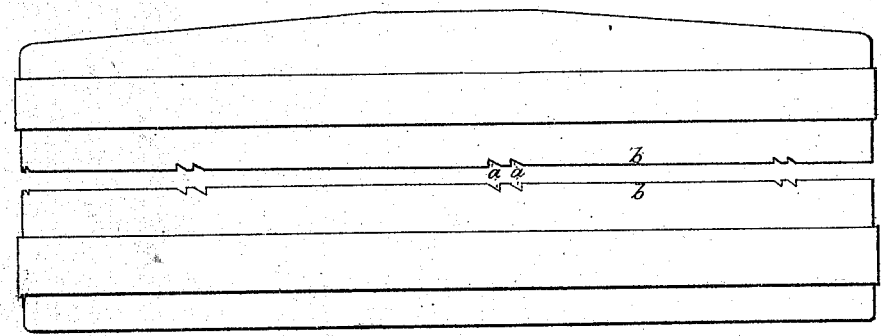

Figure 1 of the accompanying drawing is a plan or surface view of a millstone embodying my invention. Fig. 2 is an edge view of the same.

In this instance only two furrows, *a a*, are shown in a gang or bunch, although an increased number can be used. When the grain falls into the eye of the stone and is caught between the stones it is first only cracked and a motion given to it. As it is driven around between the stones each gang of furrows *a a* in the runner is constantly crossing the corresponding gangs of furrows of the bed-stone, the grain is sheared finer, and its reduction is completed to particles of the required grade by passing over the lands or flouring surfaces.

The dressing of the stones or the laying out in contiguous or adjacent gangs or bunches of furrows permits the use of a greater land or flouring surface, where the actual flouring is performed.

The advantages gained by my invention are mainly in the quantity and quality of the work done. In comparison with other millstone dresses, twice as much grain can be ground in a given time. The stones grind evener, finer, and livelier, and require less power, for the reason that by my dress the stones have more flouring surface, and more channels for the meal to escape.

I claim as my invention—

The millstone dress, consisting of the bunches or gangs of adjacent furrows *a*, with the intervening land or flouring surfaces *b*, when arranged with relation to each other, in the manner and for the purpose shown and described.

In testimony whereof I hereunto sign my name in presence of two subscribing witnesses.

MANASSEH FRIES.

Witnesses:
GEO. S. THOMPSON,
FRANCIS D. PASTORIUS.

(69.)